June 11, 1935.  H. D. GUMPPER  2,004,405

UNIT ELECTRIC POWER GENERATING PLANT

Filed July 11, 1934  4 Sheets-Sheet 1

INVENTOR
Harold D. Gumpper,

ATTORNEYS

June 11, 1935.     H. D. GUMPPER     2,004,405
UNIT ELECTRIC POWER GENERATING PLANT
Filed July 11, 1934     4 Sheets-Sheet 3

INVENTOR
Harold D. Gumpper,
BY
ATTORNEYS

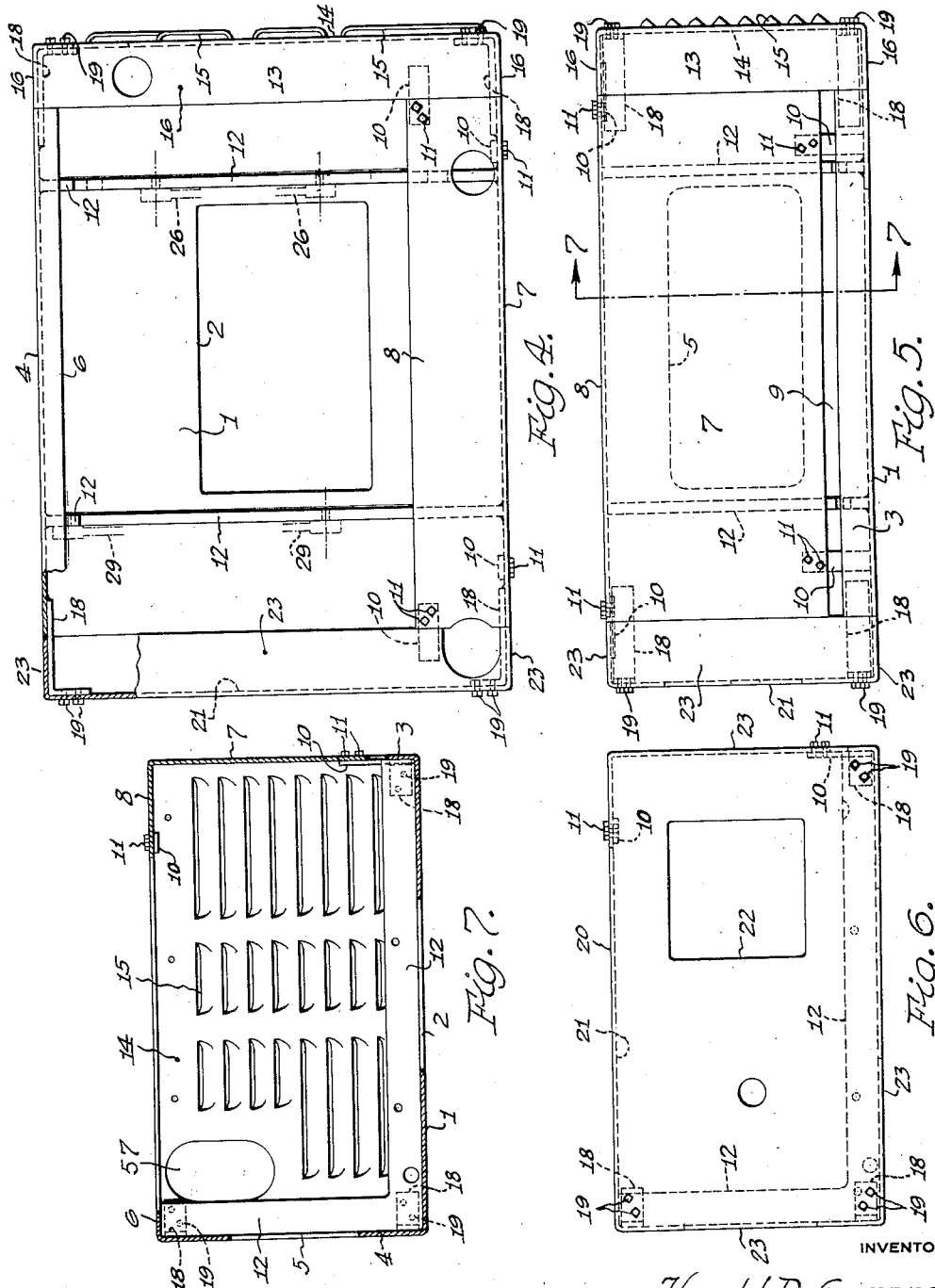

Patented June 11, 1935

2,004,405

UNITED STATES PATENT OFFICE 2,004,405

UNIT ELECTRIC POWER GENERATING PLANT

Harold D. Gumpper, Detroit, Mich.

Application July 11, 1934, Serial No. 734,630

10 Claims. (Cl. 290—1)

This invention relates to a gasoline-engine-driven-electric-generator, power plant adapted for use upon certain types of electric industrial trucks without material change in the chassis thereof, which trucks are commonly dependent upon storage batteries for their source of power, and wherein the space for such batteries is limited, particularly in height, so that it would be impossible, without rebuilding the truck, to install a conventional gasoline engine driven electric generator set having vertical cylinders and of the type disclosed in my United States Patent No. 1,947,713 of February 20, 1934, without such rebuilding of the truck.

An object of the present invention is to so arrange the several component parts and accessories required in a complete gasoline driven electric generator set, that all may be enclosed within a steel housing, casing or frame of such dimensions and construction that the same may be readily installed as a complete unit within the space commonly occupied by the batteries upon such an electric industrial truck, and may be readily removed therefrom and manipuated as a unit to gain ready access to the several devices or parts for the purpose of replacement or repair.

It is also an object to provide an arrangement of enclosing frame or casing whereby the same affords adequate means for the rigid mounting and support for engine and generator and their several accessories, and whereby the construction of which housing is such as to give ready access to engine governor, carbureter, air filter, etc., for the purpose of minor repairs or adjustments, and that oil, gasoline and water may be readily supplied without the necessity for removing the power plant from the truck.

A further object is to provide a construction of housing and arrangement of power plant therein whereby ready access may be had to the power plant for repairs to the valves, valve mechanism, pistons, connecting rods, oil pump, oil pressure regulator, water pump, magneto, fan, fan belt, radiator, muffler, oil filter, generator brushes, gasoline tank, etc., without the necessity for completely removing the power plant from its mounting in said housing; and to provide certain other new and useful features, all as hereinafter set forth and more particularly pointed out in the appended claims, reference being had to the accompanying drawings in which—

Fig. 4 is a plan view of the frame or casing within which the engine, generator, and other devices forming the complete power plant, are to be mounted and showing the same broken away and in section at one corner;

Fig. 5 is a side elevation of Fig. 4;

Fig. 6 is an end elevation of Fig. 5; and

Fig. 7 is a transverse section substantially upon the line 7—7 of Fig. 5.

Figure 1:
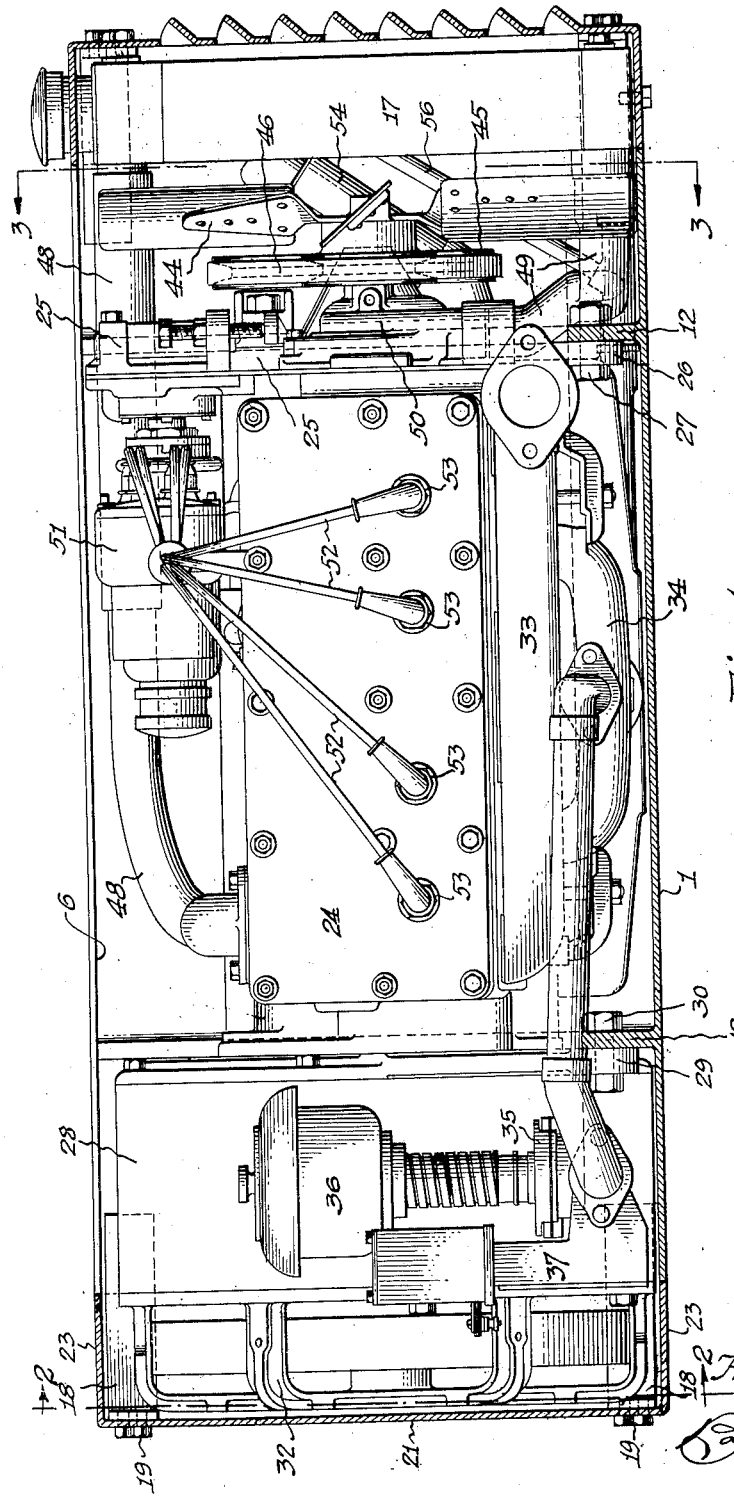
Figure 1 is a longitudinal section substantially upon the line 1—1 of Fig. 3, of a construction illustrative of an embodiment of the invention.
Figure 2:
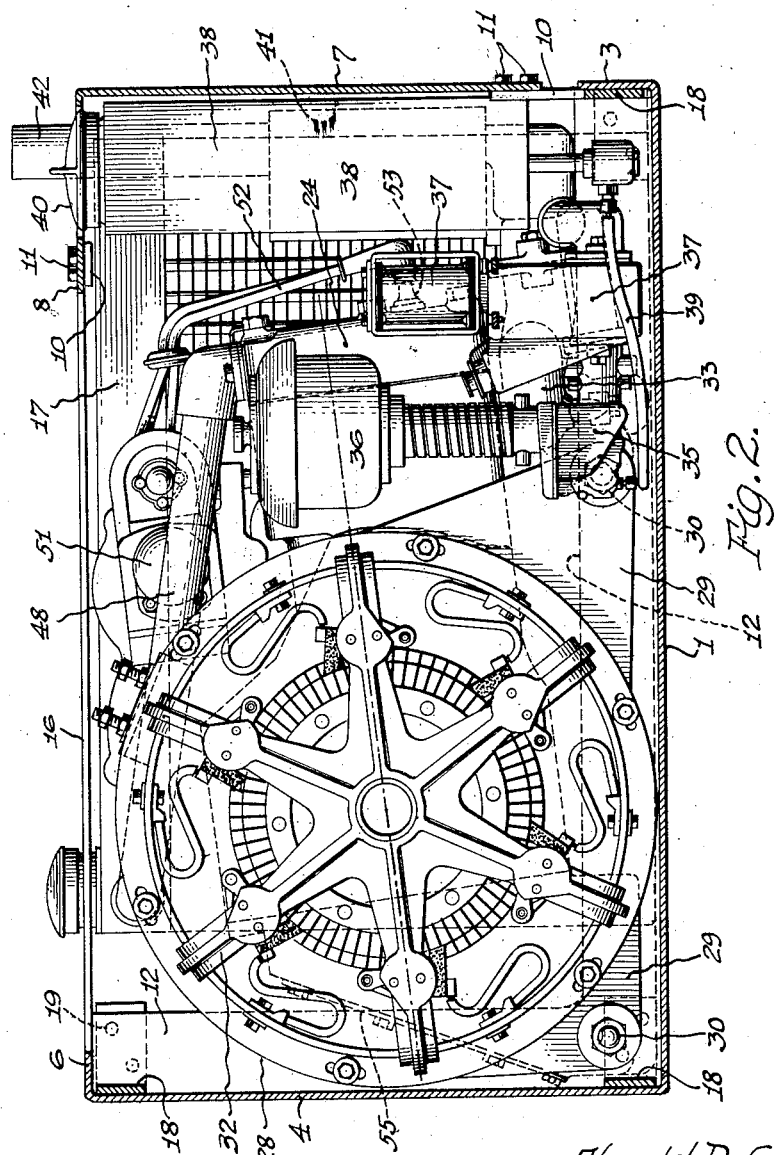
Fig. 2 is a transverse section substantially upon the line 2—2 of Fig. 1.

As shown in Figs. 4 to 7 inclusive, the combined frame and casing within which the power plant as a whole is mounted, comprises a bottom side or pan 1 of substantially rectangular form in plan view, having a central opening 2 to afford access to the interior of the casing at the lower side thereof, and this pan or bottom wall is formed with an upstanding integral flange 3 at what may be termed the forward side of the casing and the opposite or vertical rear wall 4 of the casing is formed integral with the bottom 1, this rear side wall being formed with a central opening 5 and an upper, inwardly or forwardly extending integral flange 6. The opposite or front side wall of the casing is formed by a sheet metal plate 7 having an integral inwardly or rearwardly extending flange 8 in the plane of the flange 6, the lower edge of said plate or wall 7 being spaced a short distance from the upper edge of the flange 3 to provide an open air inlet slot 9 in said front side wall of the casing, and to detachably secure the plate 7 in the vertical plane of said flange 3, angle brackets 10 are welded within the meeting angle of said flange and bottom 1, with the upwardly extending arm of each bracket spanning said slot 9 and detachably secured by bolts 11 to said plate or wall 7.

To stiffen the bottom 1 and side wall 4 and form supports for the flanges 3 and 6, a pair of angle bars 12 is welded or otherwise permanently secured to said bottom and rear side walls, these bars being spaced the proper distance apart and each at a distance inwardly from the ends of said walls with the greatest cross-sectional width of each extending inwardly from the faces of said walls to give the maximum of rigidity and strength with a minimum of weight, and forming strengthening and supporting ribs within the casing each bar abutting at its ends, the flanges 3 and 6 and welded thereto.

The front end of the casing is formed by a front end member indicated as a whole by the numeral 13 formed of sheet metal with an end wall 14 formed with louvers 15 and with top, bottom and end flanges 16, these flanges being of a width equal to or greater than the thickness of a radiator 17 of the fin and tube or other type, having top and bottom tanks, and adapted to be secured as a unit, within this casing end member which thus forms a casing for said radiator; and to detachably secure this end member in place, angle straps 18 are welded or otherwise rigidly secured at one end to the wall 4 and flanges 3 and 8, and at their opposite ends are preferably secured by bolts 19 to said end member to detachably hold the same in place.

The opposite or rear end of the casing is closed by an end member indicated as a whole by the numeral 20 and this member is quite similar to the front end member 13 except that its end wall 21 instead of being formed with louvers, is formed with a large central opening 22 affording access to the interior of the casing, this wall being formed with a wide marginal flange 23 all around, similar to the flange 16 of the front end member; and this rear end member is detachably secured to the end of the casing by angle strips and bolts, the same as those for holding the front end member.

A rigid casing of substantially rectangular form is thus formed, with a fixed bottom wall 1 and side wall 4 each formed with a large central opening to afford access to its interior, a detachable front side wall 7, and detachable end members 13 and 20, the top of the casing being open between said end members and between said top flanges 6 and 8, to provide free access to the interior of the casing. The angle bars or ribs 12 which extend transversely of the casing give rigidity thereto and form a supporting frame and rigid place of attachment for the several elements of the power and generating plant which will now be described.

The space within which it is desired to locate this complete power plant as a unit, is limited, as it is desired to substitute it for the usual storage batteries of industrial trucks, and it is therefore, highly desirable that it be of no greater dimensions than the dimensions of the storage batteries which it is to replace, so that it will be strictly a substitute for such batteries, and may be quickly installed or removed as a unit for the purpose of replacement or repair, and when installed by securing the casing in place upon the truck and then electrically connecting the generator contained in said casing, to the motor for driving the truck, will furnish the necessary current, the said generator being driven by the internal combustion engine also contained within said casing.

Figure 3:
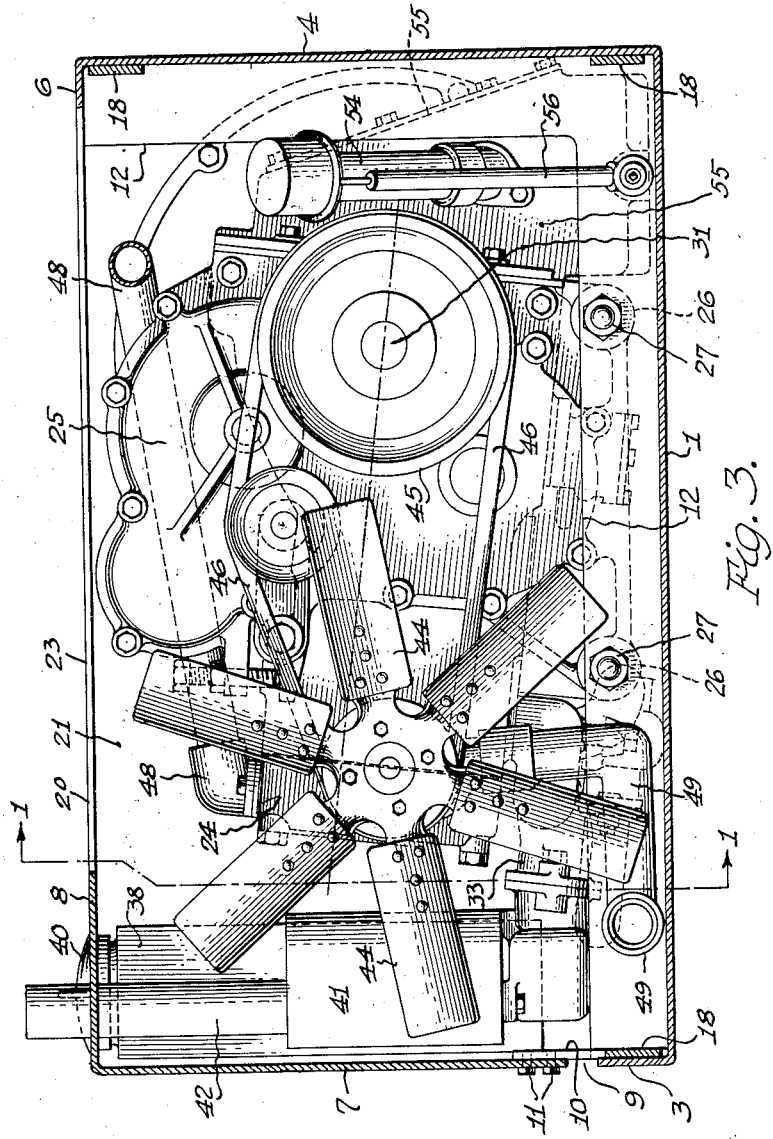
Fig. 3 is a transverse section substantially upon the line 3—3 of Fig. 1.

Known motors of the internal combustion type, when mounted in the usual manner and when of sufficient size to furnish the necessary power for an industrial or plant-service truck, all have at least one over-all dimension, usually the height, which is greater than the corresponding dimension of the limited space within which the storage batteries of such a truck are confined. It therefore becomes necessary to mount such a motor in a particular manner to bring it within such confines; and to provide a proper and convenient mounting, the previously described casing with its ribs 12 form a suitable supporting frame upon which the internal combustion engine, indicated as a whole by the numeral 24, is mounted. This engine as shown, is of the usual construction including a plurality of parallel cylinders which, in the ordinary manner of mounting the engine, are vertical, but in order that such an engine may be mounted within the limited height of this casing, it is tipped laterally as shown in Fig. 3, to a position where the axis of its cylinders as indicated by the dot and dash line, is nearly horizontal.

To rigidly mount the engine in this laterally tilted position, the forward end head or plate 25 which forms the gear casing and is bolted to the forward end of the cylinder block, is formed with laterally and downwardly projecting ears or lugs 26, each formed with a bossed opening to receive a bolt 27 for rigidly securing this end of the engine block to the rib or bar 12 which thus forms a rigid support or mounting for the forward end of the engine. The ribs 12 are spaced so that the crank case of the engine block will fit therebetween, and the generator casing 28 which is rigidly secured to the rear end of the engine crank case is formed with downwardly extending ears or lugs 29 formed with bossed openings to receive bolts 30 passed through openings in the rib or bar 12 which extends across the bottom of the casing adjacent said ears. The rear end of the engine block and also said generator, are thus secured to and rigidly mounted upon this cross angle bar or rib forming part of frame, with the armature of the generator mounted directly upon the rear end of the engine crank shaft 31. The usual cage 32 for the brushes and leads is bolted directly to the end of the casing 28 and is supported close to the end wall 21 of the enclosing casing.

The engine is mounted with its exhaust manifold 33 and intake manifold 34 at the lower side of the cylinder head, and within the space toward the forward wall 7 of the enclosing casing from the generator 28, is located the carburetor, indicated as a whole by the numeral 35, together with the air filter 36 and governor 37, and adjacent said forward wall is supported a fuel tank 38 connected to the carbureter by a pipe 39, said tank having a fill cap 40 projecting through an opening in the flange 8 of the wall 7. The exhaust manifold 33 is direct connected at the forward end of the engine, to a muffler 41 having an exhaust pipe 42 opening through the said flange 8, and an air circulating fan 44 is mounted in the usual manner, at the forward end of the engine block and is driven from a pulley 45 on the forward end of the crank shaft 31, by means of a belt 46 running over an adjustable idler 47. One side of the water jacket of the cylinder head is connected by a pipe 48 with the upper part of the radiator 17 and the lower side of said jacket is connected by a pipe 49 to the lower end of said radiator; and mounted upon the shaft of the fan 44, is a water pump, indicated at 50, in communication with the pipe 49 and interior of the water jacket to maintain a circulation of cooling water through the radiator and jacket. Mounted by means of suitable brackets, directly above the upper side of the cylinder head, is a magneto 51 having leads 52 extending to the several spark plugs 53 projecting from said head, and a crank case filler and breather pipe 54 is secured to the end of the oil pan 55 secured to the lower end of the cylinder block, said pipe extending forwardly and upwardly from the pan end with its upper end well above the level of oil contained in the crank case and where it is accessible through an opening 57 in the front end member 13 of the housing or casing. An oil gauge tube 56 also accessible through said opening 57, opens into the lowest portion of the oil pan to indicate the height of the level of oil therein.

An internal combustion engine and electric generator driven thereby, together with all accessories, such as a water cooling and circulating system, carbureter and gas tank to make a complete operative electric-power generating plant, are all thus assembled in a most compact arrangement, within a single enclosing casing, which casing may be readily detachably secured to an industrial truck or other place of use, and may be as readily removed as a unit, for replacement or repair of any of the devices contained therein, most of the parts being accessible through the open top, the openings 5, 22 and 57 in the side and end walls, and the engine head and parts are made available by the detachment of the side plate 7, without the necessity for removing the entire unit from the truck. When the unit is detached from the truck, it may be placed in the most convenient position for operation upon the parts to be repaired, the plant as a unit remaining intact and it is the specific arrangement and manner of supporting the engine and generator, which makes this complete power plant possible within a single casing of the necessarily limited dimensions.

Obviously an engine of a different construction from that shown may be employed, and other changes in the specific arrangement of the plant accessories may be made without departing from the spirit of the invention, and I do not, therefore, limit myself to the particular construction shown.

Having thus fully described my invention, what I claim is:—

1. A unit electric-power plant comprising a casing including a frame, an internal combustion engine in said casing rigidly mounted upon said frame in a laterally tilted position to bring it within the confines of said casing, a radiator within the forward end of said casing, the adjacent end wall of said casing being formed with louvers, an electric generator in said casing directly driven by said engine, a carbureter and a fuel tank in said casing to supply combustible charges to said engine, a cooling fan within said casing adjacent said radiator and driven by said engine, and a pump driven by said engine for maintaining a circulation of water through said radiator and water jacket of said engine.

2. A unit electric-power plant comprising a casing of dimensions adapting it for placement in the space occupied by the storage batteries of an industrial truck, an internal combustion engine of the multiple cylinder vertical type, said engine being mounted in said casing with the plane of the axes of said cylinders in a substantially horizontal position to bring it within the confines of said casing with its manifold side adjacent the bottom of said casing, a generator direct connected to said engine, and all engine accessories including a cooling system and fuel supplying and charge forming means to provide a complete power plant, mounted within said casing.

3. A unit electric-power plant comprising a casing of dimensions adapting it for placement in the space occupied by the storage batteries of an industrial truck, said casing having spaced apart frame members, an internal combustion engine of the multiple cylinder vertical type mounted upon and secured between said frame members in a laterally tilted position to bring it within the confines of said casing, a generator direct connected to said engine within said casing, and engine accessories necessary to make a complete operative power plant, mounted within said casing and including fuel storage and charge forming means and a water cooling and circulating system for said engine.

4. A unit electric-power plant comprising a casing of dimensions adapting it for placement in the space occupied by the storage batteries of an industrial truck, said casing being of substantially rectangular form and having spaced apart transverse frame members extending across and secured to the inner face of the bottom and one side wall of said casing, an internal combustion engine mounted upon said frame members, a generator secured to said engine and extending rearwardly in said casing beyond said members, a carbureter in the space at one side of said generator and connected to said engine, a radiator within the forward end of said casing, a pump on the forward end of the engine and connected to a water jacket thereof and with said radiator, a fuel tank in said casing for supplying fuel to said carbureter, a cooling fan mounted between said radiator and forward end of said engine, and engine driven means for driving said pump and fan.

5. A unit electric-power generating plant including a casing having a bottom wall, a fixed side wall, detachable end walls and a detachable side wall opposite said fixed wall, said casing having transverse internal frame members of right angle form secured to said bottom wall and said fixed side wall, said casing being of dimensions adapting it for placement in a space commonly occupied by the storage batteries of an industrial truck, an internal combustion engine mounted upon said frame members within the confines of said casing, a generator including a casing secured to said engine within the rear end of said casing and having an armature direct connected to said engine, and engine accessories necessary to make a completely operative power plant, mounted within said casing and including a fuel tank, charge forming means connected to said tank, and a water cooling and circulating system for said engine.

6. In a unit electric power generating plant, the combination with an internal combustion engine of the vertical type having a cylinder, an electric generator driven by said engine, cooling means for the engine, and fuel supplying means for the engine including a fuel tank and carbureter; of a supporting frame surrounding and outlining the entire plant, and means on the engine for supporting said engine upon said frame with the plane of the longitudinal axis of said engine cylinder in a substantially horizontal position and extending across said frame, to lower the over all height of said engine.

7. In a unit electric power generating plant, the combination with an internal combustion engine including a cylinder and a crankcase, an electric generator driven by said engine, cooling means for said engine including a radiator, and fuel supplying means for said engine including a fuel tank and carbureter; of a casing and supporting frame for enclosing and outlining said entire plant, said casing having bottom, side and end walls with openings in certain of said walls to afford access to said parts within said casing adjacent said openings and with frame members extending across said bottom, said radiator being positioned in said casing adjacent one end wall thereof, and means on the ends of the crankcase of the engine and extending laterally therefrom, to detachably secure said engine to said frame members in a laterally tilted position with the head end of said engine cylinder adjacent one side wall of said casing and its crankcase adjacent the opposite side wall of said casing.

8. In a unit electric power generating plant as characterized in claim 7 and wherein said electric generator is direct connected to the engine and located within said casing adjacent the rear end wall thereof provided with an opening through which said generator is accessible, said front end wall being formed with louvers opposite said radiator, said engine being positioned with its side adjacent said bottom of said casing, and said bottom being provided with an opening to provide access to engine parts located at said side of said engine adjacent said bottom.

9. A unit power generator plant including a casing of dimensions adapting it for placement in the space occupied by the storage batteries of an industrial truck and including a frame, an electric-power plant enclosed within said casing and including an internal combustion engine secured to said frame in a laterally tilted position to bring it wholly within the confines of said casing, and a generator within said casing driven by said engine, and engine accessories necessary to make a complete operative power plant, mounted within said casing.

10. A unit electric-power plant comprising a casing of dimensions adapting it for placement in the space occupied by the storage batteries of an industrial truck and including a frame, an internal combustion engine of the vertical cylinder type mounted upon said frame in a laterally tilted position to bring it within the confines of said casing, a generator direct connected to said engine within said casing, and engine accessories necessary to make a complete operative power plant, mounted within said casing.

HAROLD D. GUMPPER.